United States Patent [19]

McLean

[11] Patent Number: 4,541,786
[45] Date of Patent: Sep. 17, 1985

[54] CERAMIC TURBOCHARGER

[75] Inventor: Arthur F. McLean, Ann Arbor, Mich.

[73] Assignee: Ford Motor Company, Dearborn, Mich.

[21] Appl. No.: 652,552

[22] Filed: Sep. 20, 1984

Related U.S. Application Data

[63] Continuation-in-part of Ser. No. 414,741, Sep. 3, 1982, abandoned.

[51] Int. Cl.[4] .................. F04B 17/00; F04D 29/02
[52] U.S. Cl. .................................... 417/407; 415/214; 415/219 C; 416/241 B; 384/527
[58] Field of Search ................... 416/241 B; 415/214, 415/219 R, DIG. 5, 219 C; 417/405, 406, 407; 308/189 R, 201; 29/156.8 R, 156.8 CF

[56] References Cited

U.S. PATENT DOCUMENTS

| | | | |
|---|---|---|---|
| 3,734,650 | 5/1973 | Reisacher et al. | 417/407 |
| 3,905,723 | 9/1975 | Torti, Jr. | 415/214 X |
| 3,999,376 | 12/1976 | Jeryan et al. | 416/241 B X |
| 4,063,850 | 12/1977 | Hueber et al. | 416/241 B X |
| 4,101,243 | 7/1978 | Tatkov et al. | 415/219 C X |
| 4,239,304 | 12/1980 | Wakunami | 308/217 |
| 4,296,979 | 10/1981 | Hofmann et al. | 308/217 X |
| 4,344,289 | 8/1982 | Curiel et al. | 417/407 X |
| 4,397,507 | 8/1983 | Kraus et al. | 308/201 X |
| 4,402,108 | 9/1983 | Pannwitz | 308/230 X |
| 4,414,241 | 11/1983 | Quella et al. | 427/2 |

FOREIGN PATENT DOCUMENTS

| | | |
|---|---|---|
| 2910932 | 9/1980 | Fed. Rep. of Germany ... 416/241 B |
| 2921704 | 12/1980 | Fed. Rep. of Germany ...... 417/406 |

Primary Examiner—Carlton R. Croyle
Assistant Examiner—Jeffrey A. Simenauer
Attorney, Agent, or Firm—Clifford L. Sadler; Robert E. McCollum

[57] ABSTRACT

An essentially all ceramic turbocharger for boosting the pressure of air inducted by an internal combustion engine has a housing made in two segments from ceramic material that define exhaust gas inlet and outlet passages and air inlet and outlet passages. A rotary unit formed of ceramic material is formed integrally with a turbine rotor and compressor rotor at opposite ends of the driveshaft. The driveshaft is supported within the housing on ceramic ball bearings whose races are surfaces formed on the driveshaft and housing segments within which ceramic radial and thrust bearings are fitted.

1 Claim, 3 Drawing Figures

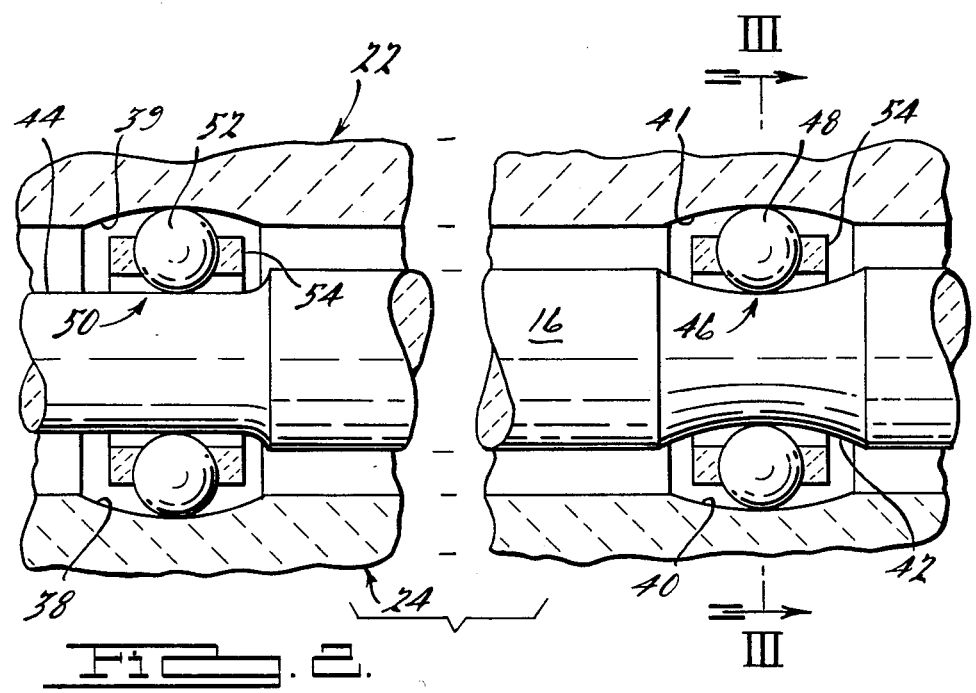
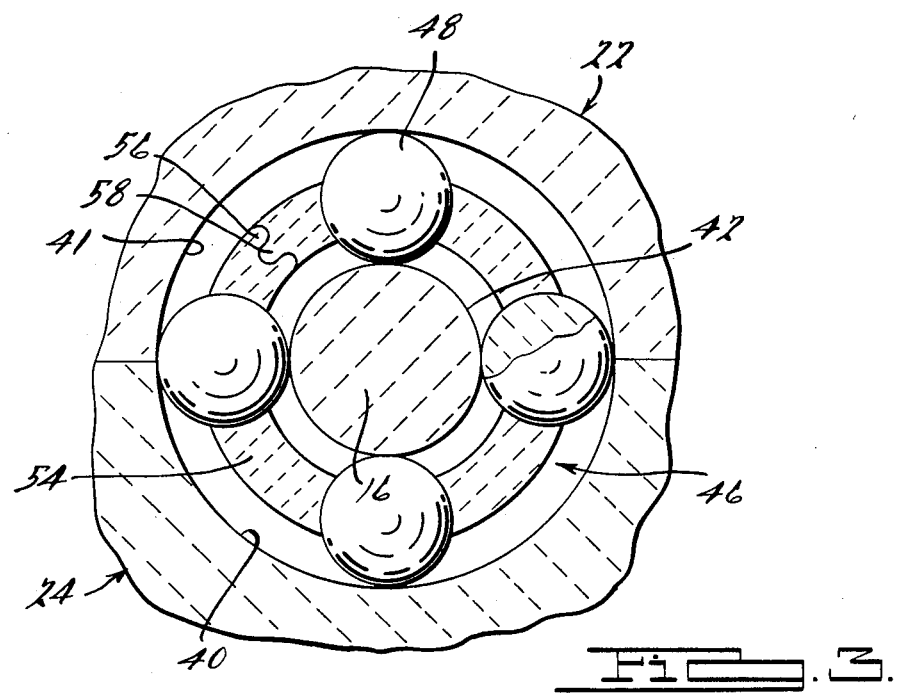

4,541,786

CERAMIC TURBOCHARGER

This application is a continuation-in-part of my prior corresponding application, U.S. Ser. No. 414,741 filed Sept. 3, 1982, now abandoned.

FIELD OF THE INVENTION

This invention pertains to turbocharged engine systems and particularly to such systems that pass the exhaust gas of the engine through a turbine which drives an air compressor that supplies air inducted by the engine.

DESCRIPTION OF THE PRIOR ACT

Conventional turbochargers pass the high temperature, high energy engine exhaust gas through a turbine rotor which drives a compressor, usually mounted coaxially with the turbine on a common driveshaft. The compressor supplied with air at ambient conditions produces a stream of high pressure air that is carried to the inlet manifold and inducted by the internal combustion engine. Turbochargers of this type have associated with their operation a characteristic delay between the time when high power output is demanded of the engine by setting the throttle to a wide open position and the time when a boost in inlet air pressure is delivered by the compressor. This delay results because time is required for the engine exhaust gas flow rate to increase and for the speed of the turbine-compressor rotors to increase to produce the required boost in inlet air pressure.

Conventional metal turbochargers are made of various metal components, the mechanical properties of the various metals being suited to the performance requirements of the components from which they are made. For instance, the turbine rotor is generally made of a nickel-based high strength alloy in order to withstand the high operating temperature environment of the turbine rotor. A steel driveshaft connects the turbine rotor and the compressor rotor, which is made of aluminum in order to keep its weight and rotary inertia low. The turbine rotor is attached to the driveshaft by friction welding and the compressor rotor is generally bolted to the driveshaft. The shaft is supported on two bronze oiled journal bearings supported in the housing. The housing for a conventional metal turbocharger is made in three segments, which are joined by abutting contact with adjacent housing sections through the use of axial tension bolts. The housing segment surrounding the compressor rotor is made from aluminum, a cast iron housing surrounds the shaft and the bearings, and a nodular iron housing surrounds the turbine rotor. The various housing materials are selected to minimize weight and cost of the turbocharger and, in the case of the turbine housing, to provide strength in order to contain the turbocharger parts in the event of a failure.

SUMMARY OF THE INVENTION

A turbocharger made according to this invention includes a rotary unit that comprises the gas turbine rotor, a compressor rotor and a driveshaft connecting the rotors. The unit is made integrally in one piece by injection molding or slip casting and is formed from silicon nitride or silicon carbide or other ceramic materials. The one-piece ceramic construction avoids the need for a mechanical attachment of the rotors to the driveshaft and its lightweight, compact design has low rotary inertia. The cost of the unit is kept low because it can be cast or molded in one operation. The housing is also formed from ceramic material and is made in two segments that are joined by a clamp that surrounds the segments and holds them in abutting contact by tension forces in the clamp. The housing defines a high pressure gas passage that carries exhaust gas from the engine outlet to the turbine and a low pressure gas passage through which exhaust gas from the turbine is returned to the exhaust gas system. At the opposite end of the housing from the turbine rotor, the housing that surrounds the compressor defines a low pressure air passage that carries air from the atmosphere to the compressor rotor and a high pressure air passage through which compressed gas is delivered from the turbocharger to the engine inlet. Lithium aluminum silicate (LAS) is the preferred material for the housing because it provides a stable support for the rotating assembly and its low expansion coefficient accommodates the high turbocharger operating temperatures. LAS can be slipcast, molded or glass-formed into the housing shape at low cost using mass production techniques. The housing produced in this way from LAS realizes a significant weight and cost reduction from the metal housings of conventional turbochargers. The heavy nodular iron housing that surrounds the turbine rotor in a metal turbocharger is not required in a ceramic turbocharger made according to this invention because its lightweight ceramic rotor has far less kinetic energy at full speed than a metal rotor. Consequently, the LAS housing can adequately withstand the impact energy resulting from a ceramic rotor failure. Suitable brackets for mounting the turbocharger to support structure can be attached to the metal clamping ring which joins the housing segments.

BRIEF DESCRIPTION OF THE DRAWING

FIG. 2 is a partial cross section of the driveshaft and housing in the vicinity of the bearings showing the bearing details.

FIG. 3 is a cross section taken at plane III—III of FIG. 2.

DESCRIPTION OF THE PREFERRED EMBODIMENT

Figure 1:
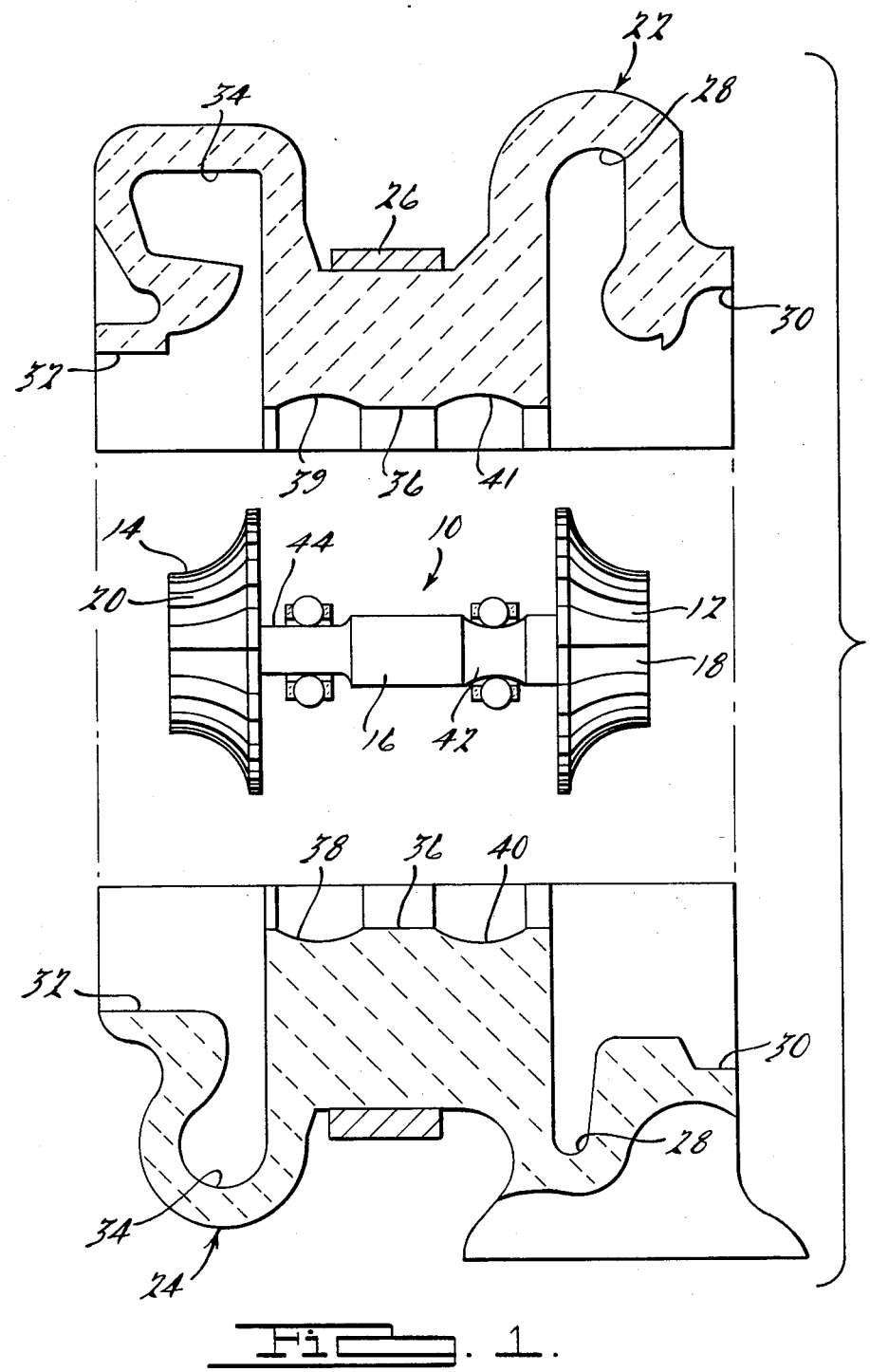
FIG. 1 is a cross section taken at a diametrical plane through the turbocharger housing segments showing the segments radially separated from one another with the rotary unit located between them.

Turning now to a more specific description of the invention and referring first to FIG. 1, a one piece ceramic unit 10 made by injection moding or slip casting silicon nitride or silicon carbide has a turbine rotor 12 located at one axial end and an essentially symetrical compressor rotor 14 located at the opposite axial end. A driveshaft 16 formed integrally with the rotors and of the same ceramic material as the rotors extends axially therebetween. The turbine rotor and compressor rotor have blades or impellers 18, 20 which produce substantially radial flow of exhaust gas and air through passages formed in the housing.

Essentially symetrical ceramic housing segments 22, 24 are fitted over the rotary unit 10 on assembly and are retained in position by a steel clamping ring 26 that surrounds the segments and, upon being drawn up rightly on their outer surfaces, causes abutting contact on mounting flanges of the segments. The interior space defined by the housings when assembled in this way defines at the turbine rotor end of the turbocharger a high pressure exhaust gas passage 28 in the form of a spiral volute that carries exhaust gas from the engine outlet to the turbine rotor. The housing also defines a low pressure gas passage 30 through which exhaust gas that has expanded upon passage through the turbine is carried to the exhaust gas system of the engine.

At the axially opposite end of the turbocharger the housing segments define a low pressure air passage 32 through which air at ambient or atmospheric conditions is carried to the compressor rotor 20. A high pressure air passage 34 in the form of a spiral volute carries compressed air from the compressor rotor to the inlet manifold of the engine.

When assembled in the manner described, the housing segments define another radial clearance space 36 within which the driveshaft is located. The inner surface of space 36 has two axially-spaced shallow circular grooves 38, 40 formed therein. Because ceramic materials, such as silicon nitride and silicon carbide from which the rotary unit is made, have excellent compression strength and withstand bearing loads well where Hertzian contact stresses are high, the outer surface of driveshaft 16 is used as an inner race for ceramic bearings that support the shaft on the housing. For this purpose, the shaft has a shallow groove 42 aligned axially with grooves 40 and 41 of the housing segments. At the opposite end of the shaft adjacent grooves 38 and 39, the shaft has a cylindrical surface 44 formed. A ceramic ball bearing assembly 46 is located within the space bounded by grooves 40-42 such that the ceramic balls contact the shallow radiused grooves in the housing and on the shaft. The number and size of the balls in each bearing is determined by the magnitude of the unbalanced loads of the rotating mass. A second ceramic ball bearing assembly 50 has the ceramic ball elements contacting cylindrical surface 44 and shallow grooves 38, 39 formed in the housing elements. Bearing assembly 46 can provide axial reaction to a thrust load applied to the driveshaft by the rotors. The tendency of driveshaft 16 to move axially under the force of the thrust loading tends to reduce the space within which the ball bearings 48 fit. Consequently, the balls apply a thrust force to the driveshaft opposite the direction of the applied thrust load.

The balls in each bearing assembly 46, 50 are contained and separated by a ceramic cage 54 made of polymer material. The cage is in the form of a circular cylinder having angularly or circumferentially spaced apertures or pockets into which the balls 48, 52 are fitted. The cage is split along its axial length at one circumferential point and formed with a slotted end in the shape of a keyway 56 into which is fitted a key 58 element formed on the adjacent cage end. Key element 58 and keyway 56 extend axially along the length of the cage, the ends of the cage being joined with adhesive in addition to the keyway attachment.

Ceramic ball bearings develop lower frictional forces than the oiled journal bearings used in conventional turbochargers. This reduced frictional force effect is extremely important in view of the response delay of the turbocharger, particularly near idle conditions. When the throttle is advanced, the power available to accelerate the turbocharger is directly reduced by the turbocharger frictional loss. At low turbocharger speed, this frictional effect is a significant portion of the total power delivered to the turbocharger so that any reduction in frictional loss greatly improves the operating efficiency of the engine system. In addition, ball bearing assemblies whose inner and outer races and balls are formed from ceramic materials can operate without oil lubrication. By eliminating the need to maintain adequate lubrication in a highspeed device such as a turbocharger, assembly is simplified and the cost of manufacturing and maintenance reduced.

From the foregoing, it will be seen that an all ceramic lightweight assembly of a rotor within a housing on ceramic ball bearing assemblies is provided, resulting in a lower cost, lower inertia system.

Having described a preferred embodiment of my invention, what I claim and desire to secure by U.S. Letters Patent is:

1. An all ceramic lightweight, low inertia turbocharger assembly for use with an internal combustion engine having an air induction system for the intake flow of air at atmospheric pressure and an exhaust gas flow outlet, consisting of a one-piece ceramic rotor assembly rotatably mounted within a two-piece ceramic housing on ceramic ball bearing assemblies therebetween;

the rotor assembly consisting of a driveshaft with a radial flow type compressor rotor formed at one end and a radial flow type turbine rotor symmetrically formed at the opposite end;

the housing comprising two essentially axially symmetrical housing segments joined together to surround the rotor assembly with a radial clearance space therebetween, the housing segments having flow passages formed therein for the flow of atmospheric air through the compressor rotor into the engine air induction system and the flow of exhaust gases through the turbine rotor to drive the same;

the ball bearing assemblies consisting of a ceramic cylindrical ball bearing cage split along its axial length and having circumferentially spaced pockets each receiving a ceramic ball rotatably therein, the ends of the cage defined by the split being joined by a keyway-slot type connection, the driveshaft having an outer surface with a first cylindrical portion defining an inner ball race and a second axially spaced portion with an annular groove therein defining a second inner ball race, the inner surface of the radially adjacent portions of the housing being formed with complementary spaced annular grooves defining outer ball races receiving and retaining the balls therein, the grooves having a radius constructed to axially retain the balls therein, the all ceramic assembly providing low weight and resultant low inertia to the parts providing fast rotatable response time upon an increase in exhaust flow against the turbine flow.

* * * * *